(12) United States Patent
Sharon et al.

(10) Patent No.: US 10,275,186 B2
(45) Date of Patent: Apr. 30, 2019

(54) SYSTEM AND METHOD OF DATA COMPRESSION AND DATA SHAPING

(71) Applicant: SANDISK TECHNOLOGIES LLC, Addison, TX (US)

(72) Inventors: Eran Sharon, Rishon Lezion (IL); Ishai Ilani, Dolev (IL); Idan Alrod, Herzeliya (IL); Ariel Navon, Revava (IL); Rami Rom, Zichron-Yaacov (IL)

(73) Assignee: SANDISK TECHNOLOGIES LLC, Addison, TX (US)

( * ) Notice: Subject to any disclaimer, the term of this patent is extended or adjusted under 35 U.S.C. 154(b) by 0 days.

(21) Appl. No.: 14/927,877

(22) Filed: Oct. 30, 2015

(65) Prior Publication Data
US 2017/0123662 A1    May 4, 2017

(51) Int. Cl.
*G06F 12/00*    (2006.01)
*G06F 3/06*    (2006.01)

(52) U.S. Cl.
CPC .......... *G06F 3/0679* (2013.01); *G06F 3/0625* (2013.01); *G06F 3/0626* (2013.01); *G06F 3/0661* (2013.01); *G06F 3/0688* (2013.01); *Y02D 10/154* (2018.01)

(58) Field of Classification Search
USPC ........................................................ 711/171
See application file for complete search history.

(56) References Cited

U.S. PATENT DOCUMENTS

| | | | |
|---|---|---|---|
| 5,949,422 A * | 9/1999 | Mochizuki | G06T 9/20 345/420 |
| 6,850,175 B1 * | 2/2005 | Bossen | H03M 7/4006 341/106 |
| 8,799,559 B2 | 8/2014 | Sharon et al. | |
| 2003/0002743 A1 * | 1/2003 | Ohta | H04N 1/41 382/239 |
| 2003/0086127 A1 * | 5/2003 | Ito | H04N 1/3333 358/462 |
| 2003/0113022 A1 * | 6/2003 | Hijiri | G06T 9/001 382/232 |
| 2004/0044824 A1 * | 3/2004 | Haneda | G10L 19/00 711/1 |
| 2010/0277353 A1 * | 11/2010 | Shalev | H03M 7/30 341/94 |
| 2013/0103891 A1 * | 4/2013 | Sharon | G06F 12/0246 711/103 |
| 2013/0179659 A1 * | 7/2013 | Seo | G06F 12/023 711/170 |
| 2014/0075271 A1 * | 3/2014 | Petrov | H03M 13/116 714/776 |
| 2014/0157086 A1 * | 6/2014 | Sharon | G06F 11/1012 714/773 |
| 2014/0181052 A1 * | 6/2014 | Moore | G06F 17/30306 707/687 |
| 2015/0179260 A1 | 6/2015 | Sharon et al. | |
| 2016/0056840 A1 * | 2/2016 | Siegert | H03M 7/30 711/114 |

* cited by examiner

*Primary Examiner* — Tuan V Thai
*Assistant Examiner* — Tasnima Matin
(74) *Attorney, Agent, or Firm* — Michael Best & Friedrich LLP (57) ABSTRACT

A data storage device includes a shaping engine and a compression engine. The shaping engine is configured to shape first data to generate second data. The compression engine is configured to compress the second data to generate third data.

24 Claims, 3 Drawing Sheets

SYSTEM AND METHOD OF DATA COMPRESSION AND DATA SHAPING

FIELD OF THE DISCLOSURE

This disclosure is generally related to compressing and uncompressing data.

BACKGROUND

Non-volatile storage devices, such as flash memory devices, have enabled increased portability of data and software applications. For example, flash memory devices can enhance data storage density by storing multiple bits in each cell of the flash memory. To illustrate, Multi-Level Cell (MLC) flash memory devices provide increased storage density by storing 3 bits per cell, 4 bits per cell, or more. Electronic devices, such as mobile phones, typically use non-volatile storage devices, such as flash memory devices, for persistent storage of information, such as data and program code that is used by the electronic device. Advances in technology have resulted in increased storage capacity of non-volatile storage devices with reductions in storage device size and cost.

Data stored on a memory of a non-volatile storage device may include compressed data. Conventional lossless compression methods, such as a Lempel-Ziv compression method or other dictionary based compression methods, have relatively high complexity when implemented for high throughput applications. For example, to achieve a high throughput, a conventional lossless compression method may split uncompressed data into chunks and the chunks may be divided between multiple processing cores that compress the chunks concurrently. Dividing the uncompressed data into multiple chunks may reduce compression efficiency as compared to a low throughput implementation that compresses the data using a single processing core. Additionally, performing the conventional lossless compression method at the non-volatile storage device may increase a size (e.g., a silicon area) of a controller of the non-volatile storage device, power consumption, and a cost of producing the controller.

DETAILED DESCRIPTION

Particular aspects of the present disclosure are described below with reference to the drawings. In the description, common features are designated by common reference numbers. Although certain examples are described herein with reference to a data storage device, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "exemplary" may indicate an example, an implementation, and/or an aspect, and should not be construed as limiting or as indicating a preference or a preferred example, implementation, and/or aspect.

Figure 1:
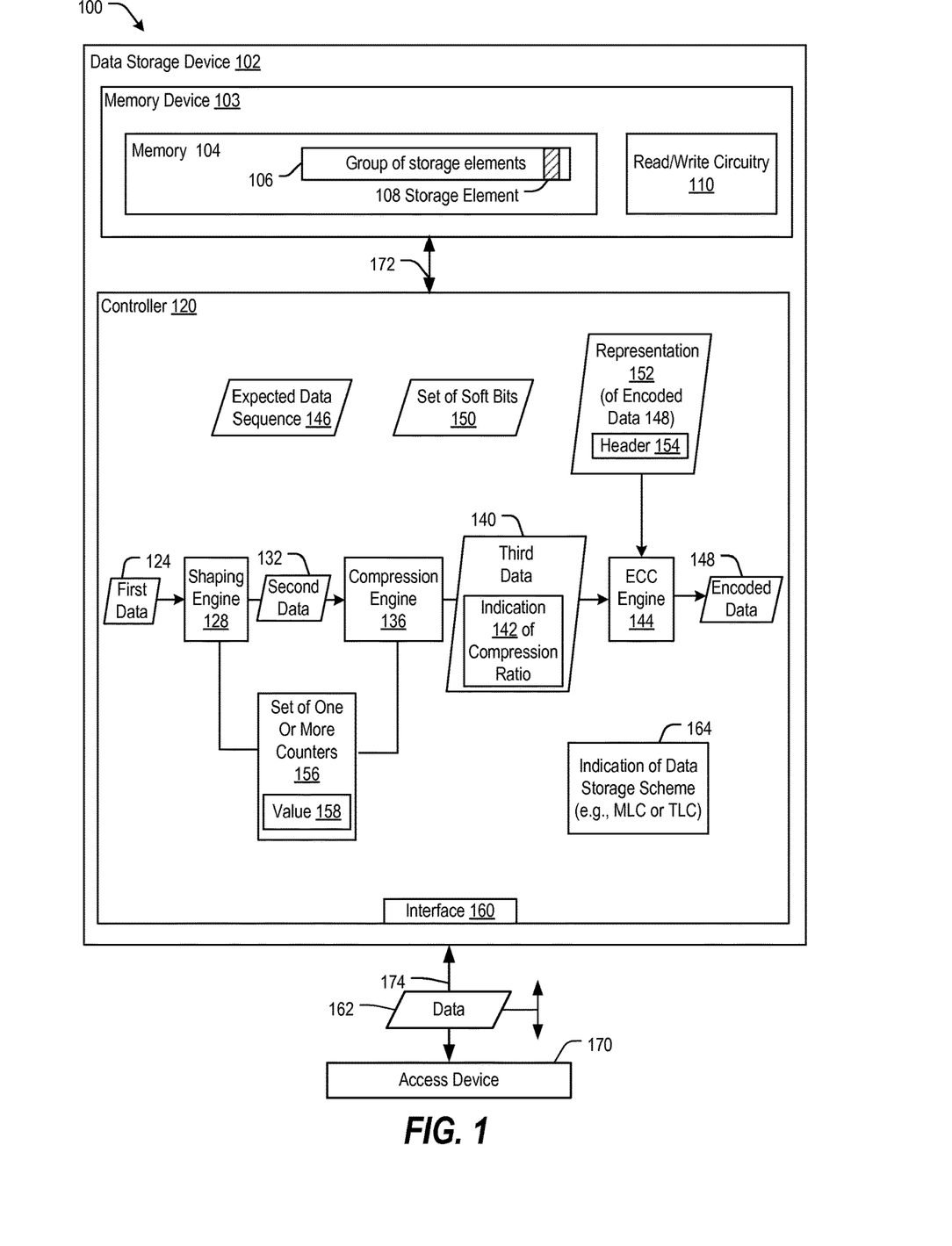
FIG. 1 is a block diagram of a particular illustrative example of a system including a data storage device that is configured to encode and decode data.

FIG. 1 depicts an illustrative example of a system 100 that includes a data storage device 102 and an access device 170, such as a host device. The data storage device 102 includes a controller 120 (e.g., a memory controller) and a memory device 103 that is coupled to the controller 120. The memory device 103 may include one or more memory dies. The memory device 103 includes a memory 104 and read/write circuitry 110. The read/write circuitry 110 is configured to write data to and to read data from the memory 104.

The controller 120 may be configured to implement a low complexity and high throughput compression scheme. To illustrate, the controller 120 may receive data and may perform a shaping operation to generate second data (e.g., shaped data). The shaping operation may transform the data to shaped data having a high population of logical is and a low population of logical 0s. Shaping the data may modify a ratio of logic one values to logic zero values of the data to increase compressibility of the data. The shaping operation may be reversible by performing a reverse shaping operation. After shaping the data, the controller 120 may perform a compression operation to compress the shaped data. In some implementations, the compression operation includes a lossless high throughput low complexity asymmetric run length encoding compression operation. The controller 120 may send the compressed data to the memory device 103 to be stored in the memory 104. In some implementations, the controller 120 may perform an error correction code (ECC) operation on the compressed data to generate encoded data that is stored in the memory 104.

Additionally or alternatively, the controller 120 may be configured to decompress (and to unshape) compressed data. To illustrate, the controller 120 may receive compressed data and may perform a decompression operation on the compressed data to generate uncompressed data. After generating the uncompressed data, the controller 120 may perform a reverse shaping operation on the uncompressed data to generate unshaped data.

The low complexity and high throughput compression scheme may be implemented by a single processing core, such as a single central processing unit. Because the low complexity and high throughput compression scheme can be implemented using a single processing core, the controller 120 may have a reduced silicon area, reduced complexity, reduced power consumption, and reduced encoding and decoding latencies as compared to a controller that uses multiple processing cores to implement a conventional lossless compression technique. Additionally, because data stored at the memory 104 is compressed rather than uncompressed, less memory space of the memory 104 is used to store the data and program/erase (P/E) cycling of the memory 104 may be reduced, which may result in an increased endurance of the memory 104.

The data storage device 102 and the access device 170 may be coupled via a connection (e.g., a communication path 174), such as a bus or a wireless connection. The data storage device 102 may include an interface 160 (e.g., an access device interface) that enables communication via the communication path 174 between the data storage device 102 and the access device 170.

The access device 170 may include a memory interface (not shown) and may be configured to communicate with the data storage device 102 via the memory interface to read data from and write data to the memory device 103 of the data storage device 102. For example, the access device 170 may operate in compliance with a Joint Electron Devices Engineering Council (JEDEC) industry specification, such as a Universal Flash Storage (UFS) Access Controller Interface specification. As other examples, the access device 170 may operate in compliance with one or more other specifications, such as a Secure Digital (SD) Access Controller specification, as an illustrative, non-limiting example. The access device 170 may communicate with the memory device 103 in accordance with any other suitable communication protocol. In some implementations, the memory interface may be configured to be coupled to multiple storage devices (e.g., multiple data storage devices).

The access device 170 may include a processor and a memory. The memory may be configured to store data and/or instructions that may be executable by the processor. The memory may be a single memory or may include multiple memories, such as one or more non-volatile memories, one or more volatile memories, or a combination thereof. The access device 170 may issue one or more commands to the data storage device 102, such as one or more requests to erase data, to read data from, or to write data to the memory device 103 of the data storage device 102. For example, the access device 170 may be configured to provide data, such as data 162, to be stored at the memory device 103 or to request data to be read from the memory device 103.

The memory device 103 of the data storage device 102 may include one or more memory dies (e.g., one memory die, two memory dies, eight memory dies, or another number of memory dies). The memory device 103 includes a memory 104, such as a non-volatile memory of storage elements included in a memory die of the memory device 103. For example, the memory 104 may include a flash memory, such as a NAND flash memory, or a resistive memory, such as a resistive random access memory (ReRAM), as illustrative, non-limiting examples. In some implementations, the memory 104 may include or correspond to a memory die of the memory device 103. In some implementations, the memory 104 may have a three-dimensional (3D) memory configuration. As an example, the memory 104 may have a 3D vertical bit line (VBL) configuration. In a particular implementation, the memory 104 is a non-volatile memory having a 3D memory configuration that is monolithically formed in one or more physical levels of arrays of memory cells having an active area disposed above a silicon substrate. Alternatively, the memory 104 may have another configuration, such as a two-dimensional (2D) memory configuration or a non-monolithic 3D memory configuration (e.g., a stacked die 3D memory configuration).

The memory 104 may include multiple groups of storage elements. For example, the memory 104 may include a representative group of storage elements 106 (e.g., a group of memory cells). The group of storage elements 106 may include a representative storage element 108 (e.g., a memory cell). Each storage element of the memory 104 may be programmable to a state (e.g., a threshold voltage in a flash configuration or a resistive state in a resistive memory configuration) that indicates one or more values. The storage element 108 may be configured to function as a single-level-cell (SLC), as a multi-level-cell (MLC), or as a tri-level-cell (TLC), as illustrative, non-limiting examples. Each of the groups of storage elements, such as the group of storage elements 106, of the memory 104 may correspond to one or more word lines, blocks, planes, or another definable group of storage elements.

The memory device 103 may include support circuitry, such as read/write circuitry 110, to support operation of one or more memory dies of the memory device 103. Although depicted as a single component, the read/write circuitry 110 may be divided into separate components of the memory device 103, such as read circuitry and write circuitry. The read/write circuitry 110 may be external to the one or more dies of the memory device 103. Alternatively, one or more individual memory dies of the memory device 103 may include corresponding read/write circuitry that is operable to read data from and/or write data to storage elements within the individual memory die independent of any other read and/or write operations at any of the other memory dies. In some implementations, the read/write circuitry 110 may be configured to generate a set of soft bits (e.g., a set of LLRs), such as a set of soft bits 150, based on a read operation. The set of soft bits may indicate a confidence (e.g., a reliability) of one or more bit values determined based on the read operation. Responsive to the read operation, the read/write circuitry 110 may provide the read data and the set of soft bits to the controller 120.

The memory device 103 may be coupled via a bus 172 to the controller 120. For example, the bus 172 may include one or more channels to enable the controller 120 to communicate with a single memory die of the memory device 103. As another example, in implementations where the memory device 103 includes multiple memory dies, the bus 172 may include multiple distinct channels to enable the controller 120 to communicate with each memory die of the memory device 103 in parallel with, and independently of, communication with other memory dies of the memory device 103.

The controller 120 is configured to receive data and instructions from the access device 170 and to send data to the access device 170. For example, the controller 120 may send data to the access device 170 via the communication path 174, and the controller 120 may receive data from the access device 170 via the communication path 174. The controller 120 is configured to send data and commands to the memory 104 and to receive data from the memory 104. For example, the controller 120 is configured to send data and a write command to cause the memory 104 to store data to one or more storage elements (corresponding to an address) of the memory 104. The write command may specify a physical address of a portion of the memory 104 (e.g., a physical address of a word line of the memory 104) that is to store the data. The controller 120 may also be configured to send data and commands to the memory 104 associated with background scanning operations, garbage collection operations, and/or wear leveling operations, etc., as illustrative, non-limiting examples. The controller 120 is configured to send a read command to the memory 104 to access data from one or more storage elements (corresponding to a specified address) of the memory 104. The read command may specify the physical address of a portion of the memory 104 (e.g., a physical address of a word line of the memory 104).

The controller 120 includes a shaping engine 128, a compression engine 136, an error correction code (ECC) engine 144, a set of one or more counters 156, and an indication 164 of a data storage scheme. The controller 120 further includes the interface 160 configured to enable communication with the access device 170. The indication 164 may represent (e.g., indicate) a data storage scheme associated with the memory 104. The data storage scheme may be associated with a number of bits-per-cell associated with the memory 104. For example, if the indication 164 has a first value, the data storage scheme may correspond to a MLC scheme used by the memory 104 to store data. Alternatively, if the indication has a second value, the data storage scheme may correspond to a TLC scheme used by the memory to store data.

The shaping engine 128 may be configured to "shape" first data 124 to generate second data 132, as described herein. The term "shaping" stems from the fact that practical schemes choose the data transformation step to yield a new sequence with some desired properties on the distribution of the input data bits, hence "shaping" that distribution. It is noted that a shaping operation is reversible to enable the original data to be recovered from manipulated data. As an example of a first shaping technique, in an SLC memory, a logical 1 may correspond to a low threshold voltage state (e.g., an erase state) and a logical 0 may correspond to a high threshold voltage state. When a cell is in an erased state (e.g., a low threshold voltage state) and a logical 1 value is to be programmed to the cell, no transition in the cell's state is required (e.g., the cell remains in the low threshold voltage state). Thus, a shaping technique applied to transform (e.g., manipulate) data may be designed to increase the 1's proportion over the 0's proportion for any given sequence of data. If a cell can be maintained in a low voltage state, an overall current through the cell's oxide isolation layer may be reduced and an endurance of the cell may be increased.

Shaping the first data 124 may include transforming the first data 124 to modify a ratio of logic one values to logic zero values of the first data 124 to increase compressibility of the first data 124. In some implementations, shaping the first data 124 may generate the second data 132 that has a particular ratio of logical ones to logical zeros.

An example of a shaping algorithm may be a greedy shaping technique, such as an adaptive shaping transform (AST) technique. The greedy shaping technique may be configured to improve (or optimize), such as maximize or minimize, some measure or criteria. For example, the greedy shaping technique may be configured to increase a number of bits that may have a particular value. To illustrate, when data is to be stored at SLC memory cells, the greedy shaping technique may be configured to increase a number of bits of data having a bit value of 1 (corresponding to a low threshold voltage state). Using the greedy shaping technique, highly shapeable data input may be highly shaped.

In a particular implementation, the shaping engine 128 may implement the greedy shaping technique that sequentially processes each bit of the first data 124 to determine whether the bit is to be a logical one or a logical zero based on a number of logical zeros in one or more windows (including one or more bit values preceding the bit). In some implementations, the shaping engine 128 may use multiple windows to increase throughput using parallel processing (e.g., one window for each processing thread). The window may include all previously processed bits of the first data 124 or may include up to a certain number of most recently processed bits of the first data 124. If the window includes a number of logical zeros that is greater than or equal to a first threshold, such as 50% zeros, a particular value of the bit may be flipped. To illustrate, if a particular bit has a logical zero value and if a majority of bit values included in the window (prior to the particular bit and not including the particular bit) are logical zero, the value of the particular bit may be changed from logical zero to logical one (e.g., the particular bit may be "flipped"). In some implementations, the second data 132 generated using the greedy shaping technique may have a percentage of logical ones that is greater than 70% logical ones. Although the first shaping operation has been described as implementing the greedy shaping technique (e.g., the AST technique), in other implementations, the first shaping operation may be configured to implement any other greedy shaping technique or a non-greedy shaping technique.

A set of one or more counters 156 may be coupled to the shaping engine 128, to the compression engine 136, or both. The set of one or more counters 156 may be configured to indicate a number of bits of the second data 132 having a particular logic value, such as a logic one value. For example, the set of one or more counters 156 may be configured to store one or more values, such as a value 158. The value 158 may indicate a number of bits having the particular logic value.

The compression engine 136 may be configured to compress the second data 132 to generate third data 140. The compression engine 136 may be configured to compress the second data 132 using one or more compression techniques, such as a lossless compression technique or a lossy compression technique. To illustrate, the one or more compression techniques may include a Lempel-Ziv (LZ) compression technique, a run length encoding (RLE) compression technique, a Huffman compression technique, or an arithmetic coding compression technique, as illustrative, non-limiting examples. The compression engine 136 may access the set of one or more counters 156 to determine the number of bits having the particular logic value. The compression engine 136 may generate a set of symbols that indicate the number of bits having the particular logic value, as described herein. In some implementations, the compression engine 136 is configured to determine the compression ratio (e.g., a compression gain factor) on-the-fly during a write process associated with the first data 124. Operations (e.g., determinations or calculations) performed "on-the-fly" may be performed in real-time or near real-time and may be performed without use of a dictionary and without generating or using a statistical model, such as a static model or a dynamic model. Additionally or alternatively, the compression engine 136 may generate an indication 142 of the compression ratio. In some implementations, the third data 140 generate by the compression engine 136 may include the indication 142.

In some implementations, the compression engine 136 may compare the compression ratio (corresponding to the indication 142) to a threshold. If the compression ratio is greater than or equal to the threshold, the compression engine 136 may provide the third data to the ECC engine 144. Alternatively, if the compression ratio is less than the threshold, the compression engine 136 may provide the second data 132 or may cause the first data 124 to be provided to the ECC engine 144.

The ECC engine 144 may be configured to receive data, such as the data 162, and to generate one or more ECC codewords (e.g., including a data portion and a parity portion) based on the data. For example, the ECC engine 144 may receive the data 162 and may generate a codeword. To illustrate, the ECC engine 144 may include an encoder configured to encode the data using an ECC encoding technique. The ECC engine 144 may include a Reed-Solomon encoder, a Bose-Chaudhuri-Hocquenghem (BCH) encoder, a low-density parity check (LDPC) encoder, a turbo encoder, an encoder configured to encode the data according to one or more other ECC techniques, or a combination thereof, as illustrative, non-limiting examples.

The ECC engine 144 may include a decoder configured to decode data read from the memory 104 to detect and correct bit errors that may be present in the data. For example, the ECC engine 144 may correct a number of bit errors up to an error correction capability of an ECC technique used by the ECC engine 144. In some implementations, the ECC engine 144 may be configured to determine and/or track a failed bit count (FBC), a syndrome weight, a bit error rate, or a combination thereof, corresponding to data decoded by the ECC engine 144. The ECC engine 144 may be included in the controller 120 or in the memory device 103. In some implementations, the ECC engine 144 may be included in the access device 170.

During operation, the shaping engine 128 is configured to shape the first data 124 to the generate second data 132. To illustrate, the first data 124 may be received from the access device 170 (or may be generated based upon data received from the access device 170), such as in connection with a request from the access device 170 for write access to the memory 104. In a particular implementation, the first data 124 may include at least a portion of the data 162 received from the access device 170.

The compression engine 136 is configured to compress the second data 132 to generate third data 140. In a particular illustrative example, the shaping engine 128 is configured to shape the first data 124 using an adaptive shaping transform (AST) shaping technique, and the compression engine 136 is configured to compress the second data 132 using an asymmetric run length encoding (RLE) technique.

In an illustrative example, the shaping engine 128 is configured to access the set of one or more counters 156 during shaping of the first data 124. For example, the shaping engine 128 may be configured to set the value 158. The value 158 may indicate a number of bits of the second data 132 having a particular logic value, such as a logic one value or a logic zero value. In an illustrative implementation, shaping the first data 124 includes modifying a ratio of logic one values to logic zero values of the first data 124 to increase compressibility of the first data 124, as described herein. For example, a compression scheme implemented by the compression engine 136 may be more effective (e.g., have an increased compressibility) for data that has a high ratio of logic one values.

The compression engine 136 may be configured to access the set of one or more counters 156 to determine a number of bits of the second data 132 having a particular logic value and to select a compression ratio for the second data 132 based on the number of bits having the particular logic value. The compression engine 136 may be configured to determine the compression ratio on-the-fly during a write process associated with the first data 124. For example, the compression engine 136 may determine a compression ratio between the first data 124 and the second data 132 in real-time or near real-time as the compression engine 136 is generating the second data 132. In some cases, the compression engine 136 may be configured to generate an indication 142 of the compression ratio, and the third data 140 may include the indication 142 of the compression ratio.

Alternatively or in addition, the compression engine 136 may be configured to determine the compression ratio based on a data storage scheme associated with the memory 104. The data storage scheme may indicate a number of bits-per-cell associated with the memory 104. For example, the data storage scheme may correspond to a multi-level cell (MLC) storage scheme that uses four states per storage element or a tri-level cell (TLC) storage scheme that uses eight states per storage element, as illustrative examples. In some cases, the controller 120 may store the indication 164 of the data storage scheme. For example, the indication 164 may be stored in a memory, a buffer, or a register of the controller 120 and may be accessible to the compression engine 136 as described herein.

Compressing the second data 132 to generate the third data 140 may include replacing a particular sequence of logic bits with an indication of a length of the sequence. For example, a sequence of logic one bits may be replaced with a number (e.g., a symbol) that specifies the number of logic one bits of the particular sequence. The compression engine 136 may retrieve the indication 164 and may generate each symbol to include a number of bits that correspond to a number of bits-per-cell associated with the memory 104, such as a number of bits-per-cell indicated by the indication 164.

In a particular implementation, the compression engine 136 may compress the second data 132 by specifying one or more symbols (e.g. values) that indicate a number of logical ones after a first logical zero and before a next second logical zero. Each symbol may have a value that can range from 0 (if the first logical zero and the second logical zero are consecutive 0's) to L, where L is less than a maximal number of states that can be stored at a particular storage element of the memory 104. For example, if the particular storage element is configured to store MLC data having four states, L is less than four. As another example, if the particular storage element is configured to store TLC data having eight stages, L is less than eight. As another example, if the particular storage element is configured to store four bits per cells having sixteen states, L is less than sixteen.

In a particular example, the memory 104 may be configured to use a TLC data storage scheme and L=6. If three bits are used per symbol, a symbol may have a value selected from the group $\{0, 1, 2, 3, 4, 5, 6, >6\}$. A symbol having a value of 7 may represent the >6 option. To compress a data sequence, such as the second data 132, the compression engine 136 may use one or more symbols to indicate a number of consecutive logical ones in the data sequence, may skip single logical zeros included in the data sequence, and may indicate two or more consecutive logical zeros in the data sequence, as described herein.

As an example of compression using symbols to indicate a number of consecutive logical ones and skipping single logical zeros, the compression engine 136 may receive a first data sequence that includes "1110111111011". The first data sequence may include a group of 3 logical ones, a first zero, a group of 6 logical ones, a second zero, and a group of 2 logical ones. The compression engine 136 may generate a first symbol having a value of 3 for the group of 3 logical ones, may skip the first zero, may generate a second symbol having a value of 6 for the group of 6 logical ones, may skip the second zero, and may generate a third symbol having a value of 2 for the group of 2 logical ones. The compression engine 136 may compress the first data sequence and may output a compressed first data sequence that includes symbols "362". Each of the symbols of the first compressed data sequence (e.g., symbols "362") may be output by the compression engine 136 as a three bit value which may be stored at the memory 104 using a TLC scheme. Accordingly, the first compressed data sequence (e.g., symbols "362") may be output as "011110010". Thus, the first data sequence includes 13 bits and the first compressed data sequence includes 9 bits. The compression engine 136 may be configured to determine a compression ratio of the number of bits (e.g., 13 bits) included in the first data sequence and the number of bits (e.g., 9 bits) included in the first compressed data sequence. For example, the compression engine 136 may determine the compression ratio on-the-fly as the compression engine 136 processes the first data sequence to generate the first compressed data sequence.

As an example of compression using one or more symbols to indicate two or more consecutive logical zeros, the compression engine 136 may receive a second data sequence that includes "1111101111001110111111000". The second data sequence may include a group of 5 logical ones, a first zero, a group of 4 logical ones, a group of 2 logical zeros, a group of 3 logical ones, a second logical zero, a group of 6 logical ones, and a group of 3 logical zeros. In this example, the compression engine 136 may generate a corresponding symbol for each group of logical ones and may skip (e.g., not generate a symbol) for each single logical zero. For each group of logical zeros (e.g., consecutive logical zeros), the compression engine 136 generates a number of symbol values each having a value of zero, where the number of symbols is 1 less than a number of consecutive logical zeros in a particular group. To illustrate, for the group of 2 logical zeros, the compression engine 136 may generate a single symbol having a value of 0. Additionally, for the group of 3 logical zeros, the compression engine 136 may generate two symbols that each has a value of zero. Accordingly, the compression engine 136 may compress the second data sequence and may output a compressed second data sequence that includes symbols "2403600". Each of the symbols of the second compressed data sequence (e.g., symbols "2403600") may be output by the compression engine 136 as a three bit value which may be stored at the memory 104 using a TLC scheme.

As an example of compressing using multiple symbols to indicate more than six consecutive logical ones, the compression engine 136 may receive a third data sequence that includes "111111011111101111111100111111111111111000". The third data sequence may include a group of 6 logical ones, a first logical zero, a group of 7 logical ones, a second logical zero, a group of 8 logical ones, a group of 2 logical zeros, a group of 16 logical ones, and a group of three logical zeros.

To compress the third data sequence, the compression engine 136 may generate a symbol having a value of 6 for the group of 6 logical ones and may skip the first logical zero. The compression engine 136 may represent the group of 7 logical ones as a first set of symbols that includes "70". If a group of logical ones includes more than 6 consecutive logical ones, multiple symbols may be used to represent the group of logical ones. For example, a symbol having a value of 7 may be generated and may be combined with a next symbol. The next symbol (following the symbol having the value of 7) may indicate a number of consecutive logical ones that follow the 7 consecutive logical ones represented by the symbol having the value of 7. In the first set of symbols "71", the symbol (7) may represent 7 logical ones and may be combined with the next symbol (0) that represents 0 logical ones. It is noted for clarity of explanation that the next symbol (0) that follows the symbol (7) does not indicate multiple logical zeros but indicates a number of consecutive logical ones. The symbol following the symbol (0) (which is combined with the symbol (7)) may be used to represent the group of 8 logical ones, as described herein. It is noted that the second logical zero may be skipped and may not be represented by a symbol.

The group of 8 logical ones may be represented by a second set of symbols that includes "71". In the second set of symbols, the symbol (7) may represent 7 logical ones and may be combined with the next symbol (1) that represents 1 logical ones. The symbol following the symbol (1) (which is combined with the symbol (7)) may represent multiple logical zeros. The compression engine 136 may represent the group of 2 logical zeros as a symbol having a value of 0.

The group of 16 logical ones may be represented as a third set of symbols that includes "772". Each symbol (7) may represent 7 logical ones and the symbol (2) may represent 2 logical ones. Each symbol (7) may be combined with a next symbol. Accordingly, the third set of symbols that includes "772" may represent 16 consecutive logical ones. The compression engine 136 may represent the group of 3 logical zeros as two symbols that each has a value of 0. Thus, the compression engine 136 may compress the third data sequence and may output a compressed third data sequence that includes symbols "67071077200". Each of the symbols of the second compressed data sequence (e.g., symbols "67071077200") may be output by the compression engine 136 as a three bit value which may be stored at the memory 104 using a TLC scheme.

The ECC engine 144 may be configured to receive the third data 140 from the compression engine 136. The ECC engine 144 may be configured to generate encoded data 148 based on the third data 140, such as by adding a set of parity bits to the third data 140 to generate the encoded data 148. In an illustrative implementation, the ECC engine 144 is configured to operate based on a low-density parity-check (LDPC) technique, such as a soft LDPC (sLDPC) technique.

The data storage device 102 may initiate a write process to store the encoded data 148 at the memory 104. For example, the controller 120 may send the encoded data 148 with a write command to the memory device 103. The write command may cause the memory device 103 to use the read/write circuitry 110 to write the encoded data 148 to the memory 104.

The memory device 103 may initiate a read process to access the encoded data 148 from the memory 104. For example, the memory device 103 may receive a read command from the controller 120, such as in response to a request for read access to the memory 104 from the access device 170. The memory device 103 may use the read/write circuitry 110 to read the memory 104 to generate a representation 152 of the encoded data 148. The representation 152 may match the encoded data 148 or may differ from the encoded data 148 due to one or more bit errors. The memory device 103 may send the representation 152 of the encoded data 148 to the controller 120.

The controller 120 may receive the representation 152 of the encoded data 148 from the memory device 103. In some implementations, the controller 120 is configured to access a header 154 of the representation 152 of the encoded data 148 to determine whether the representation 152 of the encoded data 148 is compressed. For example, if the representation 152 of the encoded data 148 is compressed, the header 154 may include a flag (e.g., one or more bits) that indicates that the data is compressed and/or may indicate a compression ratio associated with the representation 152 of the encoded data 148. To illustrate, if the third data 140 is stored to a word line of the memory 104, the header 154 may be stored as a word line header. In some implementations, the flag of the header 154 may include a single bit that indicates whether the third data 140 is compressed. In other implementations, the flag of the header 154 may include multiple bits that indicate a compression ratio. If multiple bits are used to indicate the compression ratio, a value of zero for the multiple bits may indicate that the third data 140 is uncompressed.

The controller 120 may initiate a decoding process to decode the representation 152 of the encoded data 148. For example, the controller 120 may input the representation 152 of the encoded data 148 to the ECC engine 144. The ECC engine 144 may decode the representation 152 of the encoded data 148 to generate the third data 140. In an illustrative example, the ECC engine 144 is configured to generate a set of soft bits 150 (or other reliability information) associated with the representation 152 of the encoded data 148, such as by comparing the representation 152 of the encoded data 148 to an expected data sequence 146. The expected data sequence 146 may indicate an average number of sequential logic one bits, an average number of sequential logic zero bits, or both. The set of soft bits 150 may be used by the ECC engine 144 in connection with an sLDPC technique, as an illustrative example.

The compression engine 136 may perform a decompression operation based on the third data 140. The decompression operation may generate the second data 132. The shaping engine 128 may receive the second data 132 from the compression engine 136. The shaping engine 128 may be configured to perform a reverse shaping operation based on the second data 132 to generate the first data 124. The decompression operation may be performed based on the compression ratio, such as a ratio of a number of bits of the third data 140 to the second data 132 may correspond to the compression ratio.

In some implementations, after the shaping engine 128 performs shaping to generate the second data 132, the shaping engine 128 may determine if shaping was beneficial. For example, the shaping engine 128 may determine a ratio of logical ones of the second data 132 to a total number of bits of the second data 132. The shaping engine 128 may compare the ratio to a threshold. If the ratio is greater than or equal to the threshold, the shaping engine 128 may provide the second data 132 to the compression engine 136. If the ratio is less than the threshold, the shaping engine 128 may provide the first data 124 to the compression engine 136 or to the ECC engine 144.

In some implementations, the compression engine 136 may determine a compressibility of data (e.g. the second data 132) received by the compression engine 136. If the compressibility is greater than or equal to a second threshold the compression engine 136 may compress the data. If the compressibility is less than the second threshold, the compression engine 136 may provide the data to the ECC engine 144 without compressing the data.

As described herein, compression and decompression performed by the compression engine 136 may be performed on-the-fly. Compression and decompression performed "on-the-fly" may be completed without storing or reading additional data at the memory 104. For example, compression performed on-the-fly may be performed without use of a dictionary and without generating or using a statistical model, such as a static model or a dynamic model.

Although shaping performed by the shaping engine 128 has been described as using a greedy shaping technique, such as an adaptive shaping transform (AST) algorithm, the shaping engine 128 is not to be limited to a greedy shaping technique. For example, the shaping engine 128 may perform shaping using any shaping technique. Although compression performed by the compression engine 126 has been described as using the RLE scheme, the compression engine 126 is not to be limited to the RLE scheme. For example, the compression engine 136 may perform compression using any compression technique.

In some implementations, the controller 120 may include a tracking table. The tracking table may include information that identifies portions of the memory 104. For each portion, the information may indicate a storage scheme corresponding to the portion, whether the portion stores shaped data or unshaped data, and whether the portion stores compressed data or uncompressed data, a compression scheme used to compress data stored at the portion, or a combination thereof.

In some implementations, controller 120 may include or may be coupled to a particular memory (not shown) that is distinct from the memory device 103 (e.g., the memory 104). The particular memory may be configured to store the indication 164, the tracking table, or both. The particular memory may include a non-volatile memory, a volatile memory, a random access memory (RAM), or a read only memory (ROM). The particular memory may be a single memory component, multiple distinct memory components, and/or may include multiple different types (e.g., volatile memory and/or non-volatile) of memory components. In some implementations, the particular memory may be included in the access device 170.

In some implementations, the data storage device 102 may be attached to or embedded within one or more access devices, such as within a housing of the access device 170. For example, the data storage device 102 may be embedded within the access device 170, such as in accordance with a Joint Electron Devices Engineering Council (JEDEC) Solid State Technology Association Universal Flash Storage (UFS) configuration. For example, the data storage device 102 may be configured to be coupled to the access device 170 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). To further illustrate, the data storage device 102 may be integrated within an apparatus (e.g., the access device 170 or another device), such as a mobile telephone, a computer (e.g., a laptop, a tablet, or a notebook computer), a music player, a video player, a gaming device or console, an electronic book reader, a personal digital assistant (PDA), a portable navigation device, or other device that uses non-volatile memory.

In other implementations, the data storage device 102 may be implemented in a portable device configured to be selectively coupled to one or more external access devices. For example, the data storage device 102 may be removable from the access device 170 (i.e., "removably" coupled to the access device 170). As an example, the data storage device 102 may be removably coupled to the access device 170 in accordance with a removable universal serial bus (USB) configuration. In still other implementations, the data storage device 102 may be a component (e.g., a solid-state drive (SSD)) of a network accessible data storage system, such as an enterprise data system, a network-attached storage system, a cloud data storage system, etc.

In some implementations, the data storage device 102 may include or correspond to a solid state drive (SSD) which may be included in, or distinct from (and accessible to), the access device 170. For example, the data storage device 102 may include or correspond to an SSD, which may be used as an embedded storage drive (e.g., a mobile embedded storage drive), an enterprise storage drive (ESD), a client storage device, or a cloud storage drive, as illustrative, non-limiting examples. In some implementations, the data storage device 102 is coupled to the access device 170 indirectly, e.g., via a network. For example, the network may include a data center storage system network, an enterprise storage system network, a storage area network, a cloud storage network, a local area network (LAN), a wide area network (WAN), the Internet, and/or another network. In some implementations, the data storage device 102 may be a network-attached storage (NAS) device or a component (e.g., a solid-state drive (SSD) device) of a data center storage system, an enterprise storage system, or a storage area network.

The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof. In some implementations, the data storage device 102 and the access device 170 may be configured to communicate using one or more protocols, such as an eMMC protocol, a universal flash storage (UFS) protocol, a universal serial bus (USB) protocol, a serial advanced technology attachment (SATA) protocol, a peripheral component interconnect express (PCIe), a non-volatile memory express (NVMe), and/or another protocol, as illustrative, non-limiting examples.

Although one or more components of the data storage device 102 have been described with respect to the controller 120, in other implementations, certain components may be included in the memory device 103 (e.g., the memory 104). For example, the shaping engine 128, the compression engine 136, the ECC engine 144, and/or the set of one or more counters 156 may be included in the memory device 103. Alternatively, or in addition, one or more functions as described above with reference to the controller 120 may be performed at or by the memory device 103. For example, one or more functions of the shaping engine 128, the compression engine 136, the ECC engine 144, and/or the set of one or more counters 156 may be performed by components and/or circuitry included in the memory device 103.

Alternatively, or in addition, one or more components of the data storage device 102 may be included in the access device 170. For example, one or more components of the shaping engine 128, the compression engine 136, the ECC engine 144, and/or the set of one or more counters 156 may be included in the access device 170. Alternatively, or in addition, one or more functions, as described above with reference to the controller 120, may be performed at or by the access device 170. As an illustrative, non-limiting example, the access device 170 may be configured to shape the first data 124 to generate the second data 132, and to compress the second data 132 to generate the third data 140.

As another illustrative, non-limiting example, the access device 170 may be configured to perform a decompression operation based on a first representation of data to generate a second representation of the data, and to perform a reverse shaping operation based on the second representation of the data to generate a third representation of the data. The first representation of the data may be associated with the third data 140, the second representation of the data may be associated with the second data 132, and the third representation of the data may be associated with the first data 124.

One or more modules or engines described herein may take the form of a packaged functional hardware unit designed for use with other components, a portion of a program code (e.g., software or firmware) executable by a (micro)processor or processing circuitry, or a self-contained hardware or software component that interfaces with a larger system, as illustrative, non-limiting examples. For example, one or more of the shaping engine 128, the compression engine 136, or the ECC engine 144 may take the form of a packaged function hardware unit, such as an application-specific integrated circuit (ASIC). The packaged functional hardware units (e.g., an ASIC) may be included in or correspond to the controller 120, the memory device 103, or the access device 170 of FIG. 1. In some implementations, the data storage device 102 may include multiple packaged functional hardware units, such as a first packaged functional hardware unit including the shaping engine 128, a second packaged functional hardware unit including the compression engine 136, and/or a third packaged functional hardware unit include the ECC engine 144.

The controller 120 may perform a compression operation on shaped data, such as the second data 132, using a low complexity compression technique, such as the RLE compression technique. In some implementations, the controller 120 may implement the RLE compression technique using a single processing core. Because the controller 120 can perform compression using a single processing core, the controller 120 may have a reduced silicon area, complexity, power consumption, and encoding and decoding latencies as compared to a controller that implements a conventional lossless compression technique. Additionally, because data stored at the memory 104 is compressed rather than uncompressed, less memory space of the memory 14 is used to store the data and program/erase (P/E) cycling of the memory 104 may be reduced which may result in an increased endurance of the memory 104.

Figure 2:
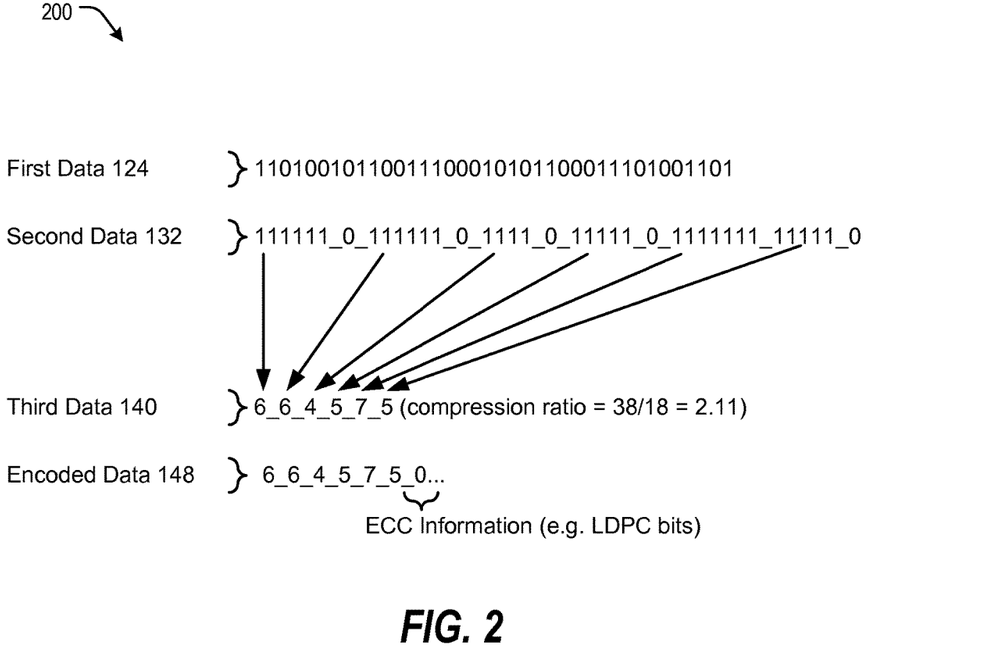
FIG. 2 is a block diagram of a particular illustrative example of encoding data by the data storage device of FIG. 1.

Referring to FIG. 2, an illustrative example to illustrate encoding data is depicted and designated 200. For example, the data may be encoded by the controller 120 of the data storage device 102 of FIG. 1.

The example 200 includes the first data 124, the second data 132, the third data 140, and the encoded data 148. In the example 200, the first data 124 includes a set of logic one bits and a set of logic zero bits. In some cases, a number of the logic one bits may be approximately equal to a number of the logic zero bits. To illustrate, the example 200 illustrates that the first data may include seventeen logic one bits and fifteen logic zero bits.

The shaping engine 128 of FIG. 1 may shape the first data 124 to generate the second data 132. To illustrate, the shaping engine 128 may transform the first data 124 to generate the second data 132. A number of logic one bits of the second data 132 may be greater than a number of logical one bits of the first data 124.

The compression engine 136 of FIG. 1 may compress the second data 132 to generate the third data 140. For example, the compression engine 136 may replace one or more sequences of logic bits with one or more values indicating a number of the logic one bits. To illustrate, the example 200 illustrates that a first sequence of six logic one bits of the second data 132 may be replaced by a value of six for the third data 140, a second sequence of six logic one bits of the second data 132 may be replaced by a value of six for the third data 140, and a third sequence of four logic one bits of the second data 132 may be replaced by a value four for the third data 140. Additionally, a fourth sequence of five logic one bits of the second data 132 may be replaced by a value of five for the third data 140, a fifth sequence of logic one bits of the second data 132 may be replaced by a value of seven for the third data 140, and a sixth sequence of logic one bits of the second data 132 may be replaced by a value of five for the third data 140. In the example 200, a compression ratio associated with the third data 140 may be equal to 38/18, or approximately 2.11.

In some implementations, the ECC engine 144 of FIG. 1 may be configured to encode the third data 140 to generate the encoded data 148. For example, the ECC engine 144 may generate ECC information, such as one or more LDPC bits. Thus, the example 200 illustrates encoding data, such as the first data 124, to generate encoded data, such as the third data 140 (or the encoded data 148).

Figure 3:
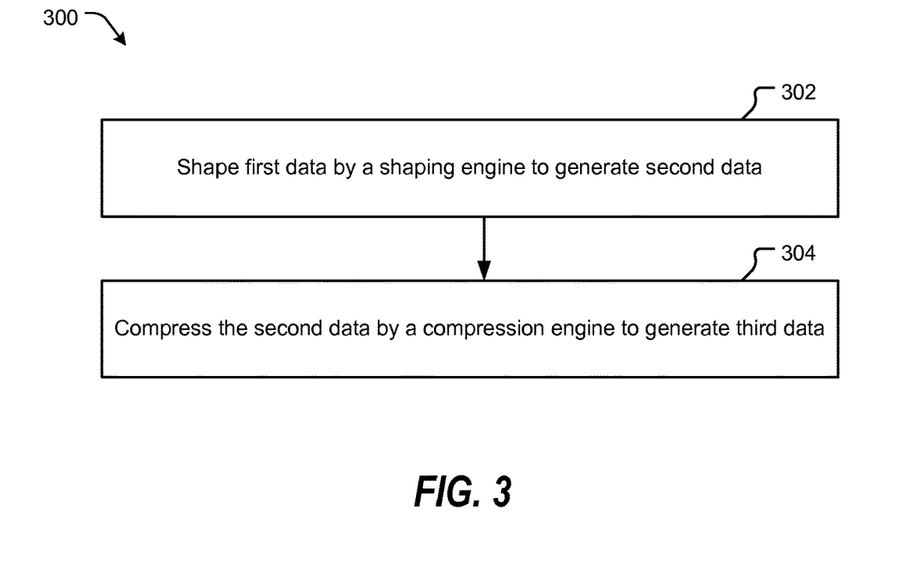
FIG. 3 is a flowchart of a particular illustrative example of a method of encoding data that may be performed by the data storage device of FIG. 1.

Referring to FIG. 3, a particular illustrative example of a method of encoding data is depicted and generally designated 300. The method 300 may be performed at the data storage device 102, such as performed by the controller 120 and/or the access device 170 of FIG. 1, or a combination thereof, as illustrative, non-limiting examples. To illustrate, the method 300 may be performed by the shaping engine 128, the compression engine 136, and/or the ECC engine 144 of FIG. 1.

The method 300 includes shaping first data by a shaping engine to generate second data, at 302. For example, the first data and the second data may include or correspond to the first data 124 and the second data 132, respectively, of FIG. 1. The shaping engine may include or correspond to the shaping engine 128 of FIG. 1. In some implementations, first data is shaped using an adaptive shaping transform (AST) shaping technique.

The method 300 also includes compressing the second data by a compression engine to generate third data, at 304. For example, the compression engine may include or correspond to the compression engine 136 of FIG. 1. The third data may include or correspond to the third data 140 of FIG. 1. In some implementations, the second data is compressed using an asymmetric run-length-encoding (ARLE) compression technique. Additionally or alternatively, a number of bits per symbol used to compress the second data may corresponds to a number of bits-per-cell associated with a memory of a data storage device, such as the memory 104 of the data storage device 102 of FIG. 1.

In some implementations, shaping the first data may include modifying a ratio of logic one values to logic zero values of the first data to increase compressibility of the first data. Additionally or alternatively, compressing the second data may include replacing a particular sequence of logic one bits with an indication of a length of the sequence. The indication may specify a number of the logic one bits.

In a particular implementation, shaping the first data may include performing AST shaping by the controller. The AST shaping may transform the first data to the second data which as a high number of logical ones and a low number of logical zeros. Additionally, compressing the second data may include performing ARLE by the controller. If data is to be stored at the memory as TLC data, performing ARLE may transform each sequence of logical ones included in the second data into one or more numbers that indicate how may logical ones are included in the sequence. Each number of the one or more numbers may have a value between 0-7 (which corresponds to the eight states that may be stored at a stored element configured to store TLC data). After the third data is generated, the controller may calculate a data compression gain of the third data and may compare the data compression gain to a threshold. If the data compression gain is less than the threshold, the first data or the second data may be stored to the memory. If the data compression gain is greater than or equal to the threshold, the compressed data may be stored to the memory along with a flag (e.g., a compression indicator data bit) that is stored in a header along with the third data. For example, if the third data is stored to a word line of the memory, the flag may be stored as a word line header. In some implementations, after the second data is compressed to generate the third data, the third data may be encoded by an ECC engine to add parity bits to the third data. The parity bits may be added to the third data to enable sLDPC decoding.

The method 300 may enable a controller to compress data, such as shaped data. A compression scheme used by the controller to compress the data may have low complexity and high throughput.

Figure 4:
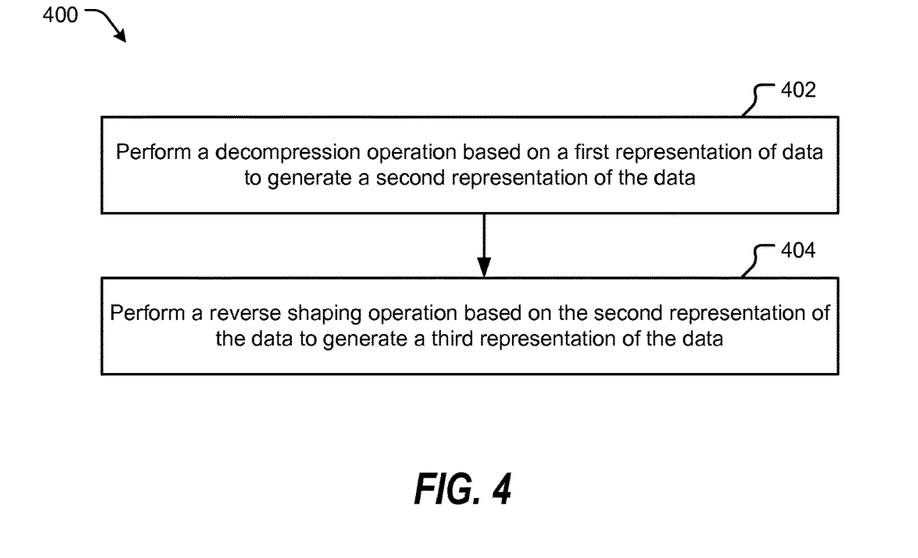
FIG. 4 is a flowchart of another illustrative example of a method of decoding data that may be performed by the data storage device of FIG. 1.

Referring to FIG. 4 a particular illustrative example of a method of decoding a representation of data is depicted and generally designated 400. The method 400 may be performed at the data storage device 102, such as performed by the controller 120 and/or the access device 170 of FIG. 1, or a combination thereof, as illustrative, non-limiting examples. To illustrate, the method 400 may be performed by the shaping engine 128, the compression engine 136, and/or the ECC engine 144 of FIG. 1.

The method 400 includes performing a decompression operation based on a first representation of data to generate a second representation of the data, at 402. The decompression operation may be performed by the compression engine 136 of FIG. 1. For example, the compression engine 136 (configured to perform decompression) may receive the first representation of data as an input and may output the second representation of the data.

The method 400 also includes performing a reverse shaping operation based on the second representation of the data to generate a third representation of the data, at 404. The reverse shaping operation may be performed by the shaping engine 128 of FIG. 1. For example, the shaping engine 128 may receive the second representation of the data as an input and may output the third representation of the data. The third representation of the data may include or correspond to the data 162 that is provided from the controller 120 to the access device 170 of FIG. 1.

In some implementations, prior to performing the decompression operation, the method 400 may include accessing a header associated with the data to determine whether the data is compressed. If the data is compressed, the header may indicate a compression ratio (e.g., a compression gain factor) associated with the data and the decompression operation may be performed based on the compression ratio. For example, the compression ratio (e.g., the compression gain factor) may correspond to a ratio a number of bits of the second representation of the data and a number of bits of the first representation of the data.

Additionally or alternatively, in other implementations, prior to performing the decompression operation, the method 400 may include receiving an encoded representation of the data. For example, the encoded representation of the data may include or correspond to the representation 152 of FIG. 1. The encoded representation of the data may be received at a controller of the data storage device from a memory of the data storage device. To illustrate, the encoded representation of the data may be received by the controller 120 from the memory device 103 of the data storage device 102 of FIG. 1. In some implementations, the method 400 may include determining a set of soft bits associated with the encoded representation of the data by comparing the encoded representation of the data to an expected data sequence. The expected data sequence may indicate an average number of sequential logic one bits, an average number of sequential logic zero bits, or both. The encoded representation of the data may be decoded using the soft bits to generate the first representation of the data. For example, the encoded representation of the data may be decoded using a soft low-density parity-check (sLDPC) decoding technique.

Thus, the method 400 may enable decoding a representation of data. In some implementations, the representation of the data may be decoded to generate shaped data.

The method 300 of FIG. 3 and/or the method 400 of FIG. 4 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 300 of FIG. 3 and/or the method 400 of FIG. 4 can be initiated or controlled by one or more processors, such as one or more processors included in or coupled to a controller or a memory of the data storage device 102, and/or the access device 170 of FIG. 1. A controller configured to perform the method 300 of FIG. 3 and/or the method 400 of FIG. 4 may be able to encode data and/or decode a representation of data. As an example, one or more of the methods of FIGS. 3-4, individually or in combination, may be performed by the controller 120 of FIG. 1. To illustrate, a portion of one of the methods FIGS. 3-4 may be combined with a second portion of one of the methods of FIGS. 3-4. Additionally, one or more operations described with reference to the FIGS. 3-4 may be optional, may be performed at least partially concurrently, and/or may be performed in a different order than shown or described.

Although various components of the data storage device 102, such as the controller 120 of FIG. 1 are depicted herein as block components and described in general terms, such components may include one or more physical components, such as hardware controllers, one or more microprocessors, state machines, logic circuits, one or more other structures, other circuits, or a combination thereof configured to enable the various components to perform operations described herein.

Components described herein may be operationally coupled to one another using one or more nodes, one or more buses (e.g., data buses and/or control buses), one or more other structures, or a combination thereof. One or more aspects of the various components may be implemented using a microprocessor or microcontroller programmed to perform operations described herein, such as one or more operations of the method 300 of FIG. 3 and/or the method 400 of FIG. 4.

Alternatively or in addition, one or more aspects of the data storage device 102, such as the controller 120 of FIG. 1 may be implemented using a microprocessor or microcontroller programmed (e.g., by executing instructions) to perform operations described herein, such as one or more operations of the method 300 of FIG. 3 and/or one or more operations of the method 400 of FIG. 4, as described further herein. As an illustrative, non-limiting example, the data storage device 102 includes a processor executing instructions (e.g., firmware) retrieved from the memory 104. Alternatively or in addition, instructions that are executed by the processor may be retrieved from a separate memory location that is not part of the memory 104, such as at a read-only memory (ROM).

In some implementations, each of the controller 120, the memory device 103, and/or the access device 170 of FIG. 1 may include a processor executing instructions that are stored at a memory, such as a non-volatile memory of the data storage device 102 or the access device 170 of FIG. 1. Alternatively or additionally, executable instructions that are executed by the processor may be stored at a separate memory location that is not part of the non-volatile memory, such as at a read-only memory (ROM) of the data storage device 102 or the access device 170 of FIG. 1.

The memory device 103 (e.g., the memory 104) may include a resistive random access memory (ReRAM), a three-dimensional (3D) memory, a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, a phase change memory (PCM) or another flash memory), an erasable programmable read-only memory (EPROM), an electrically-erasable programmable read-only memory (EEPROM), a read-only memory (ROM), a one-time programmable memory (OTP), or a combination thereof. Alternatively, or in addition, the memory device 103 (e.g., the memory 104) may include another type of memory. The memory device 103 (e.g., the memory 104) of FIG. 1 may include a semiconductor memory device.

Semiconductor memory devices include volatile memory devices, such as dynamic random access memory ("DRAM") or static random access memory ("SRAM") devices, non-volatile memory devices, such as magneto resistive random access memory ("MRAM"), resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some implementations include a resistivity switching storage element, such as an anti-fuse, phase change material, etc., and optionally a steering element, such as a diode, etc. Further by way of non-limiting example, active semiconductor memory elements include EEPROM and flash memory device elements, which in some implementations include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of a non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional illustrative structures described but cover all relevant memory structures within the scope of the disclosure as described herein and as understood by one of skill in the art. The illustrations of the examples described herein are intended to provide a general understanding of the various aspects of the disclosure. Other implementations may be utilized and derived from the disclosure, such that structural and logical substitutions and changes may be made without departing from the scope of the disclosure. This disclosure is intended to cover any and all subsequent adaptations or variations of various implementations. Those of skill in the art will recognize that such modifications are within the scope of the present disclosure.

The above-disclosed subject matter is to be considered illustrative, and not restrictive, and the appended claims are intended to cover all such modifications, enhancements, and other implementations, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   a counter;
   a shaping engine configured to shape first data to generate second data and to set a value of the counter based on the second data having a particular logic value; and
   a compression engine configured to access the counter and to compress the second data based on the number bits having the particular logic value to generate third data.

2. The data storage device of claim 1, wherein the compression engine is further configured to generate a set of symbols that indicate the number of bits having the particular logic value.

3. The data storage device of claim 2, wherein the compression engine is further configured to determine a compression ratio on-the-fly during a write process associated with the first data.

4. The data storage device of claim 3, wherein the compression engine is further configured to generate an indication of the compression ratio, and wherein the third data includes the indication of the compression ratio.

5. The data storage device of claim 2, further comprising a memory, wherein the compression engine is further configured to generate multiple symbols to compress the second data, each symbol including a number of bits based on a data storage scheme associated with the memory.

6. The data storage device of claim 5, wherein the data storage scheme indicates a number of bits-per-cell associated with the memory.

7. The data storage device of claim 1, further comprising:
a controller that includes the shaping engine and the compression engine; and
a memory device coupled to the controller.

8. The data storage device of claim 1, wherein the shaping engine is further configured to set the value to indicate a number of logic one bits of the second data or to indicate a number of logic zero bits of the second data.

9. The data storage device of claim 1, wherein the compression engine is further configured to compress the second data based on a compression ratio, wherein the third data includes a header having an indication of the compression ratio, and wherein the compression engine is further configured to decompress a representation of the third data based on the indication of the compression ratio.

10. A method comprising:
at a data storage device that includes a shaping engine, a counter, and a compression engine, performing:
shaping first data by the shaping engine to generate second data;
setting a value of the counter, the value indicating a number of bits of the second data having a particular logic value; and
based on the number of bits having the particular logic value indicated by the value of the counter, compressing the second data by the compression engine to generate third data.

11. The method of claim 10, wherein shaping the first data includes modifying a ratio of logic one values to logic zero values of the first data to increase compressibility of the first data.

12. The method of claim 10, wherein compressing the second data includes replacing a particular sequence of logic one bits with an indication of a length of the sequence.

13. The method of claim 12, wherein the indication specifies a number of the logic one bits.

14. The method of claim 10, wherein the first data is shaped using an adaptive shaping transform (AST) shaping technique, and wherein the second data is compressed using an asymmetric run-length-encoding (ARLE) compression technique.

15. The method of claim 10, wherein a number of bits per symbol used to compress the second data corresponds to a number of bits-per-cell associated with a memory of the data storage device.

16. An apparatus comprising:
means for indicating a value;
means for shaping first data to generate second data and for seitting the value to indicate a number of bits of the second data having a particular logic value; and
means for compressing the second data based on the number bits having the particular logic value to generate third data and for performing, based on information indicating whether a first representation of the third data is compressed and further indicating whether the first representation of the third data is shaped, a decompression operation to generate a second representation of the second data,
wherein the means for shaping is configured to perform, based on the information, a reverse shaping operation based on the second representation of the second data to generate a third representation of the first data.

17. The method of claim 10, further comprising accessing the value by the compression engine to determine a compression ratio based on the number of bits having the particular logic value.

18. The apparatus of claim 16, wherein the data includes a header, and wherein the header indicates a compression ratio associated with the data.

19. The apparatus of claim 18, wherein the means for compressing and for performing the decompression operation is configured to perform the decompression oepration based on the compression ratio.

20. The apparatus of claim 19, wherein a ratio of a number of bits of the second representation of the second data to a number of bits of the first representation of the third data corresponds to the compression ratio.

21. The apparatus of claim 16, further comprising means for receiving the first representation of the third data from a memory.

22. The apparatus of claim 21, further comprising means for determining a set of soft bits associated with the first representation of the third data by comparing the first representation of the third data to an expected data sequence.

23. The apparatus of claim 22, wherein the expected data sequence indicates an average number of sequential logic one bits, an average number of sequential logic zero bits, or both.

24. The apparatus of claim 22, wherein the means for determining the set of soft bits is configured to decode the first representation of the third data based on a soft low-density parity-check (sLDPC) decoding technique at least partially based on the set of soft bits.

* * * * *